United States Patent
Babin

(10) Patent No.: US 8,599,745 B2
(45) Date of Patent: *Dec. 3, 2013

(54) PAUSING KEEP-ALIVE MESSAGES AND ROAMING FOR VIRTUAL PRIVATE NETWORKS ON MOBILE COMPUTING DEVICES TO SAVE BATTERY POWER

(75) Inventor: Stephen W. Babin, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/337,357

(22) Filed: Dec. 27, 2011

(65) Prior Publication Data

US 2012/0099501 A1    Apr. 26, 2012

Related U.S. Application Data

(63) Continuation of application No. 12/715,487, filed on Mar. 2, 2010, now Pat. No. 8,085,702, which is a continuation of application No. 11/425,412, filed on Jun. 21, 2006, now Pat. No. 7,672,264.

(51) Int. Cl.
*H04B 1/38* (2006.01)

(52) U.S. Cl.
USPC .......................... 370/318; 455/434; 455/466

(58) Field of Classification Search
USPC ............... 455/434, 466, 515, 553.1; 370/318
See application file for complete search history.

(56) References Cited

U.S. PATENT DOCUMENTS

| | | | | |
|---|---|---|---|---|
| 5,926,404 | A | * | 7/1999 | Zeller et al. .................... 713/321 |
| 6,009,325 | A | * | 12/1999 | Retzer et al. ................... 455/434 |
| 7,149,556 | B2 | | 12/2006 | Angelo et al. |

OTHER PUBLICATIONS

USPTO, "Office Action," May 24, 2010.
Goshorn, "Response to Office Action," Aug. 24, 2010.

* cited by examiner

*Primary Examiner* — Phuoc Doan
(74) *Attorney, Agent, or Firm* — Matthew B. Talpis; Gregory K. Goshorn; Greg Goshorn, P.C.

(57) ABSTRACT

Provided is a method, system and programming product for maintaining a connection between a mobile device and a server over a wireless network in a manner that conserves the power supply of the mobile device. The claimed subject matter addresses the transmission of regular "keep-alive" packets to refresh a network address translation (NAT) server and the scanning for and connecting to faster, higher priority network connections. A configurable parameter, or power timeout, specifies an idle time. When a period of time equal to the parameter has passed with no traffic between the mobile device and the server, in either direction, periodic roaming scans and keep-alive messages are halted. As soon as traffic is resumed through the tunnel, the mobile device roams to the highest priority connection and roaming scans and keep-alive messages are resumed.

25 Claims, 5 Drawing Sheets

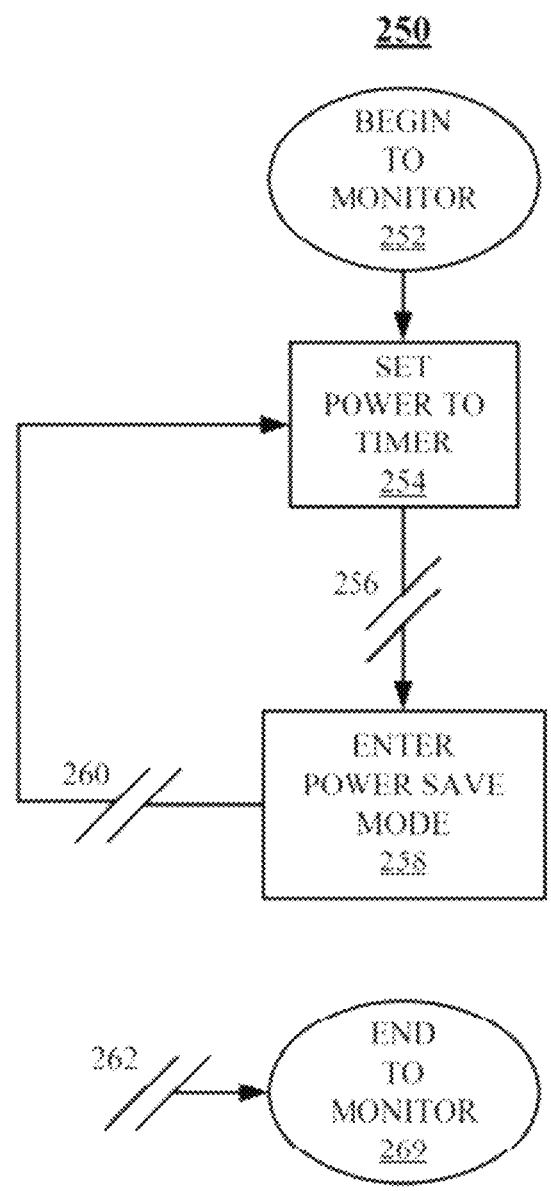

PAUSING KEEP-ALIVE MESSAGES AND ROAMING FOR VIRTUAL PRIVATE NETWORKS ON MOBILE COMPUTING DEVICES TO SAVE BATTERY POWER

CROSS-REFERENCES TO RELATED APPLICATIONS

The present application is a continuation and claims the benefit of the filing date of an application entitled, "Pausing Keep-Alive Messages and Roaming for Virtual Private Networks on Handheld Devices to Save Battery Power," Ser. No. 12/715,487, filed Mar. 2, 2010, now U.S. Pat. No. 8,085,702, issued Dec. 27, 2011, assigned to the assignee of the present application, and herein incorporated by reference; which is a continuation and claims the filing data of an application entitled, "Method of Pausing Keep-Alive Messages and Roaming for Virtual Private Networks on Handheld Devices to Save Battery Power," Ser. No. 11/425,412, filed Jun. 21, 2006, now U.S. Pat. No. 7,672,264, issued Mar. 2, 2010, assigned to the assignee of the present application, and herein incorporated by reference.

TECHNICAL FIELD

The present invention relates generally to power conservation on mobile devices and, more specifically, to a method of pausing certain maintenance functions on handheld communication devices during periods of inactivity.

BACKGROUND OF THE INVENTION

A virtual private network (VPN), such as Websphere Everyplace Connection Manager (WECM) published by International Business Machines Corp. (IBM) of Armonk, N.Y., enables a client device to connect from outside of a firewall to a corporate network protected by the firewall. Using a VPN, a client device or application can communicate with server processes on the corporate network over a secure channel, or "tunnel." When logging into a server through a VPN connection, the client typically must negotiate a new VPN session with the server and enter credentials, which may entail entering a secure identification (ID) code. This "up-front" overhead can be time consuming. To avoid the overhead associated with establishing a VPN connection, a client typically logs into the server through the VPN and remains logged in for extended periods of time.

Many current communication devices are wireless and depend upon battery power to operate. Three (3) areas in which battery-powered devices employing VPN expend energy are as follows: 1) transferring data through the device's network hardware; 2) transmitting regular "keep-alive" packets to refresh a network address translation (NAT) server; and 3) scanning for and connecting to faster, higher priority network connections.

A Network Address Translation (NAT) is often employed to enable a group of machines with local area network (LAN) access to share a single or small group of external IP addresses. The NAT maintains a table to keep track of connection mappings, which are identified via port addresses. An incoming packet from an external network must have an open mapping entry to ensure a message is delivered to a destination, or client, machine serviced by the NAT. A NAT serves three main purposes: 1) providing a type of firewall by hiding internal IP addresses; 2) enabling a company to use more internal IP addresses since they're used internally only; and 3) allowing a company to combine multiple communication connections into a single Internet connection.

To maximize efficiency, VPN software typically encapsulates transformed network traffic into UDP packets for sending over a network. One issue with UDP over a NAT is that frequent "keep-alive" packets must be transmitted. NAT mapping entries are only created from the client side and are typically discarded if not used for a preconfigured period of time. This timeout is implemented to prevent further, and perhaps unauthorized, traffic from coming in on the particular mapping. Since a NAT timeout prevents a client from receiving further packets from a server, keep-alive packets are sent at regular intervals, with each interval shorter than the NAT mapping timeout value. This prevents the situation in which the client sends a request, the server takes longer than the timeout value to respond and the NAT therefore discards the server's response.

UDP NAT timeouts are often in the range of thirty (30) second to one (1) minute, as opposed to TCP connections that may remain open up to twenty-four (24) hours. Further, a connection may only need to remain active during specific, client-initiated operations, such as, but not limited to, synching an email program or browsing a web page. In these situations, a premature NAT timeout can cause a program hang or a synchronization event to failure.

Scanning for and connecting to faster, higher priority connections, or "roaming," also present issues. Power is expended both searching for a new connection and making the connection. The power expenditure may be worthwhile if a device is active but may be wasteful if not. For example, a device that is not in use is wasting power if the device scans and makes connections while a user is simply walking down the street or driving in an automobile.

As explained above, during periods of inactivity, a connection through a NAT is typically maintained by transmitting keep-alive packets. Otherwise, information returned from a server may be lost due to a NAT timeout. Although the power necessary to transmit keep-alive packets is not an issue for personal computers (PCs) or laptops that are connected to a sustainable power source, extra packet transmission is an issue for devices powered by batteries. Devices such as pocket PCs and cellular telephones have a limited battery charge and any unnecessary power usage limits the amount of time the devices can be used in between charges.

What is needed is a power conservation technique for mobile devices that minimize the need for keep-alive messages. In addition, such a method should preferably also reduce the overhead associated with establishing a VPN connection and the processing and associated power usage of roaming when the device is not in use.

SUMMARY OF THE INVENTION

Provided is a method for maintaining a VPN connection between a mobile device and a server over a wireless network in a manner that conserves the power supply of the mobile device. The claimed subject matter addresses two issues, described above in the Background, associated with the expenditure of energy by battery-powered devices; i.e. the transmission of regular "keep-alive" packets to refresh a network address translation (NAT) server; and the scanning for and connecting to faster, higher priority network connections. In other words, the disclosed techniques address the issue of power consumption of a mobile device maintaining a VPN connection while the mobile device is inactive.

A configurable parameter, or power timeout, specifies an idle time. When a period of time equal to the parameter has passed with no traffic between the mobile device and the VPN server, in either direction, periodic roaming scans and keep-alive messages are halted. As soon as traffic is resumed through the tunnel, the mobile device roams to the highest priority connection and roaming scans and keep-alive messages are resumed.

For example, if the power timeout is set to a value of twenty (20) minutes, and an email through the VPN tunnel is initiated, the connection is maintained throughout the synchronization. Twenty minutes after the synchronization has completed, if there is no further traffic, the keep-alive packets and the roaming cease, thus conserving power. When the user performs another synchronization, or initiates any other traffic, the mobile device establishes a channel on the highest priority connection, periodically scans for a higher priority connection and resumes transmission of keep-alive packets.

After a power timeout implanted in accordance with the claimed subject matter, the original VPN connection is still valid so there is no overhead associated with establishing a VPN connection. However, typically a corresponding NAT entry is not valid. When the client reinitiates the connection, a new NAT entry is created, with the client possibly communicating via a different IP address. In that case, a short exchange between the VPN server and the client to register the changed IP address is executed, an exchange that is both fast and transparent to the user.

The claimed subject matter enables a VPN connection to be maintained, conserving power usage during periods of inactivity and without the necessity of logging in and establishing a VPN connection each time. In addition to periodic email synchronization the claimed subject matter is also applicable to, but not limited to, the intermittent downloading of Internet web pages.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE FIGURES

A better understanding of the present invention can be obtained when the following detailed description of the disclosed embodiments is considered in conjunction with the following figures.

FIG. 5 is a flowchart of a Timeout (TO) Monitor Power process according to the claimed subject matter.

DETAILED DESCRIPTION OF THE FIGURES

Although described with particular reference to a mobile telephone, the claimed subject matter can be implemented in any communication system in which power conservation is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for conserving power in mobile communication devices. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
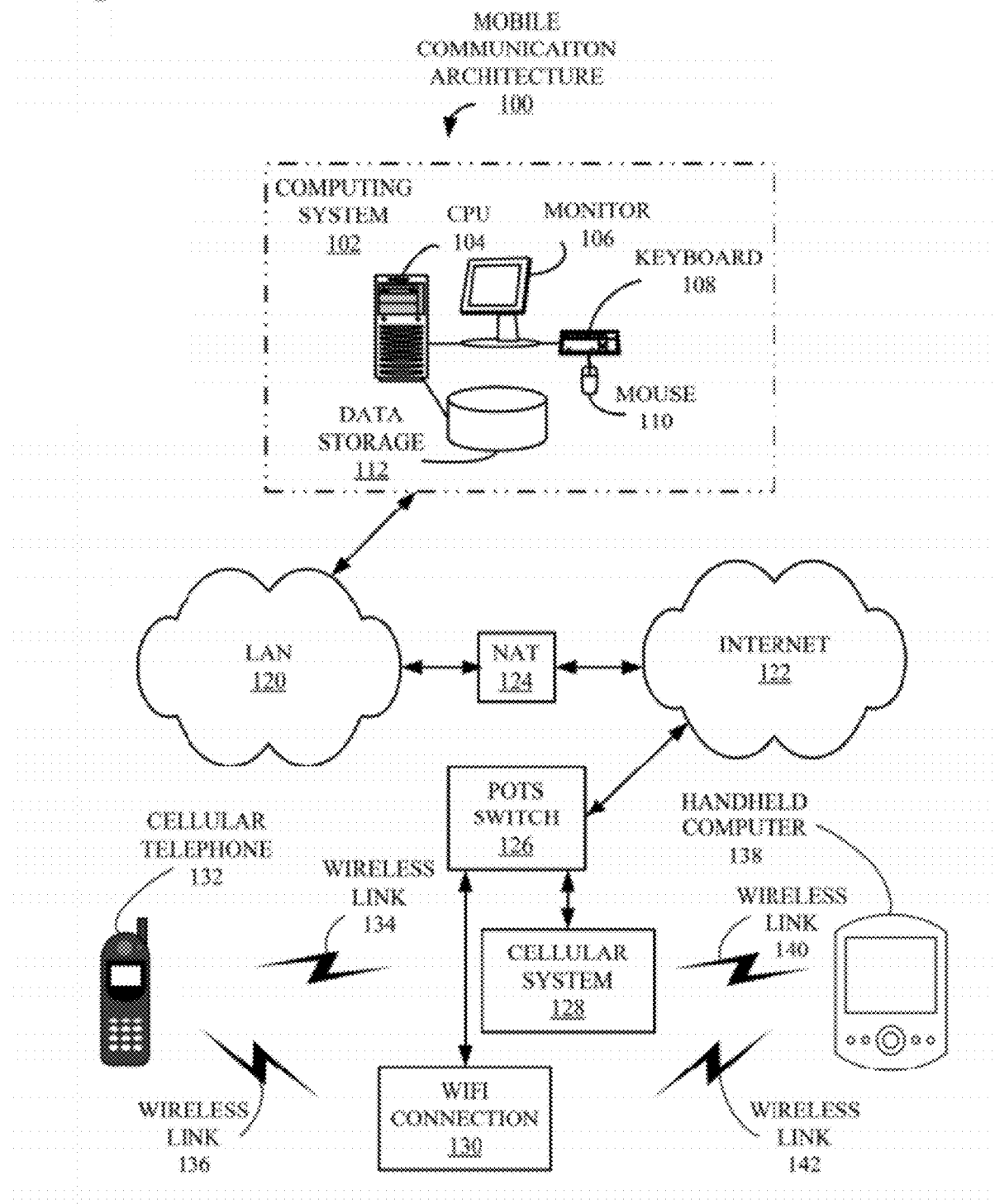
FIG. 1 is a block diagram of an exemplary mobile communication architecture that incorporates the claimed subject matter.

Turning now to the figures, FIG. 1 is an exemplary mobile communication architecture 100, implemented according to the claimed subject matter. It should be noted that architecture 100 is only one example of a configuration in which the claimed subject matter may be implemented. Those with skill in the computing and communication arts should appreciate that there are many types of devices and communication and computing environment that may be incorporated into such a system.

Architecture 100 includes a computing system 102. Computing system 102 includes a central processing unit (CPU) 104, coupled to a monitor 106, a keyboard 108 and a mouse 110, which together facilitate human interaction with computer 102. Also included in computer 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown).

Computing system 102 is communicatively coupled to a local area network (LAN) 120. LAN 120 is coupled to the Internet 122 via a network address translation device (NAT) 124. As explained above in the Background, NAT 124 is employed to enable a group of devices with access to LAN 120 access to share a single or small group of external IP addresses, corresponding to Internet 122. Also connected to Internet 122 is a plain old telephone switch (POTS) 126. A cellular system 128 and a WiFi connection 130 are coupled to POTS 126 and, via POTS 126, to Internet 122. In this example, two mobile communication/computing devices, i.e. a cellular telephone 132 and a handheld computer 138, are both able to communicate with cellular system 128 and WiFi connection 130.

Wireless link 134 represents a communication link between cellular telephone 132 and cellular system 128. Wireless link 136 represents a communication link between cellular telephone 132 and WiFi connection 130. Typically, only one of links 134 and 136 is active. Cellular telephone 132 "roams" between links 134 and 136, as well as other possible communication links, which for the sake of simplicity are not shown. Cellular telephone 132 selects which of links 134 or 136 to utilize based upon preconfigured parameters. Fro example, telephone 132 may select the link 134 or 136 based either upon the strength of the connection or the relative costs of the connections 134 and 136. Power Conservation Logic (PCL) 150 (see FIG. 2) determines whether or not telephone 132 continues to roam following a predetermined period of inactivity. The function of PCL 150 is explained in more detail below in conjunction with FIGS. 2-5.

Wireless link 140 represents a communication link between handheld computer 138 and cellular system 128. Wireless link 142 represents a communication link between handheld computer 138 and cellular system 130. Typically, only one of links 140 and 142 is active. Like telephone 132, handheld computer 138 "roams" between links 140 and 142, as well as other possible communication links, which for the sake of simplicity are not shown, and selects which of links 140 or 142 to utilize based upon preconfigured parameters. Handheld computer 138 also incorporates logic like PCL 150 to determine whether or not computer 138 continues to roam following a predetermined period of inactivity.

Figure 2:
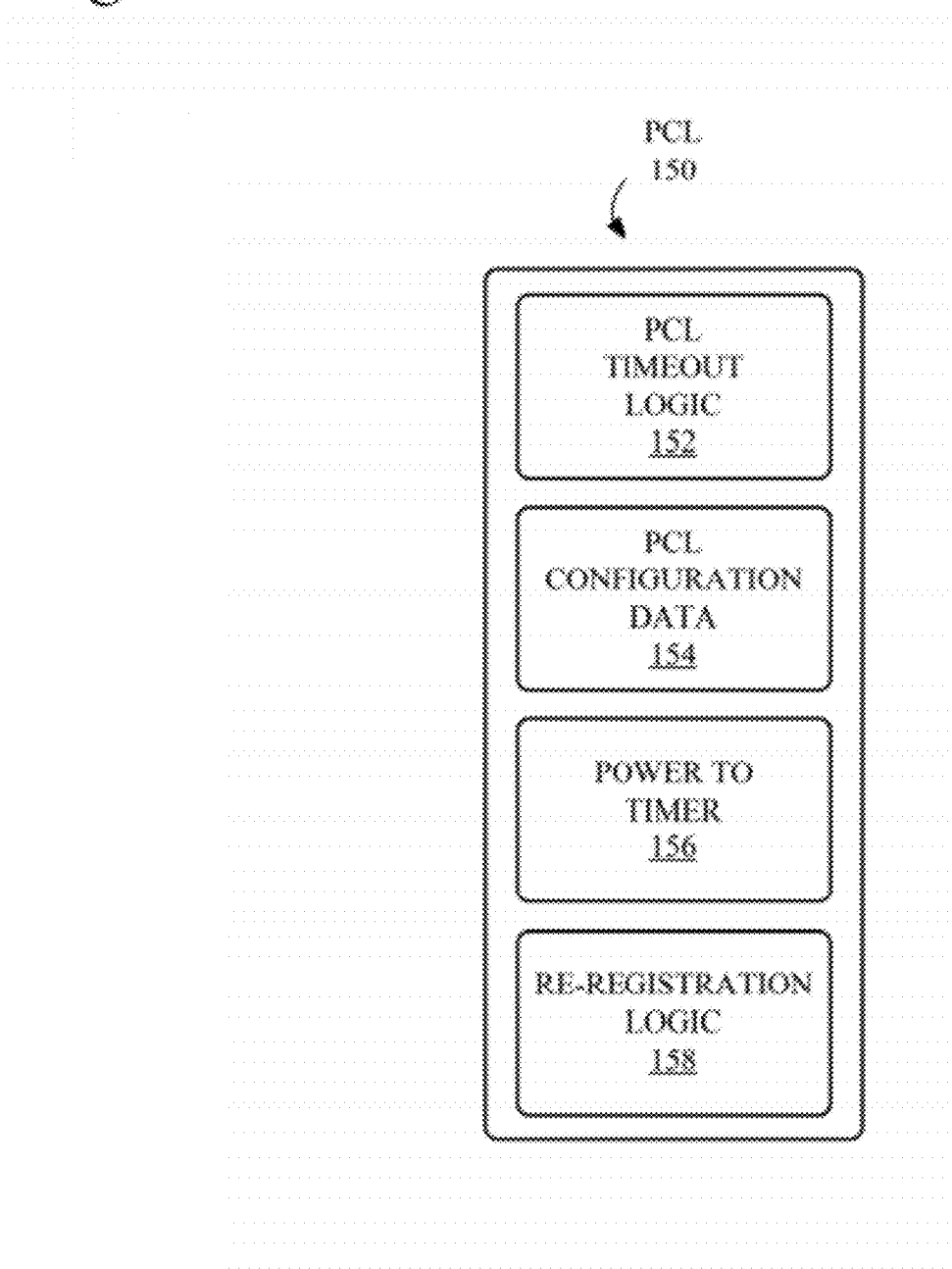
FIG. 2 is a block diagram of a power conservation module (PCM) that implements the claimed subject mater.

FIG. 2 is a block diagram of power conservation logic (PCL) 150 that implements the claimed subject mater. In the following description, PCL 150 is incorporated into the logic of cellular telephone 132 (FIG. 1). It should be noted that telephone 132 is used for illustrative purposes only and that are many types of communication devices, such as but not limited to handheld computer 138 (FIG. 1), that may take advantage of the claimed technology.

PCL 150 includes a PCL timeout logic module 152 that controls the implementation of the claimed subject matter. In other words, module 152 executes code to halt the transmission of keep-alive messages from, in this example, cellular telephone 132. In addition, module 152 halts the roaming functionality of cellular telephone 132.

A PCL configuration data module 154 stores information, or parameters, associated with a particular implementation of the claimed subject matter. One example of a parameter stored in conjunction with data 154 is a power timeout. A power timeout specifies an interval of time that is required to pass without activity on telephone 132 before logic 152 suspends roaming activity and the transmission of keep-alive messages. The power timeout parameter mat be set, or configured, by a user of telephone 132. A second parameter, or power state, stored in conjunction with data 154 is an indication of whether or not telephone 132 is currently in the power conservation state, i.e. operating with suspended keep-alive messages and roaming.

A power timeout (TO) timer 156 keeps track of the interval of time between the current time and the last time that the VPN of the subject device, or telephone 132, has been active. If this calculated interval of time is longer or equal to the power timeout value stored in data 154, a signal is transmitted to logic 152 to execute the power conservation methods of the claimed subject matter. The use of timer 156 is explained in more detail below in conjunction with FIGS. 4 and 5.

A re-registration module 158 executes if telephone 132 is in the power conservation state as indicated by one of the exemplary, power state parameter stored in data 154 and described above. If power state parameter indicates telephone 132 is in a power conservation mode and activity is detected, then re-registration logic executes to reestablish the registration of telephone 132 with NAT 124. The re-registration process is described in more detail below in conjunction with FIG. 3.

Figure 3:
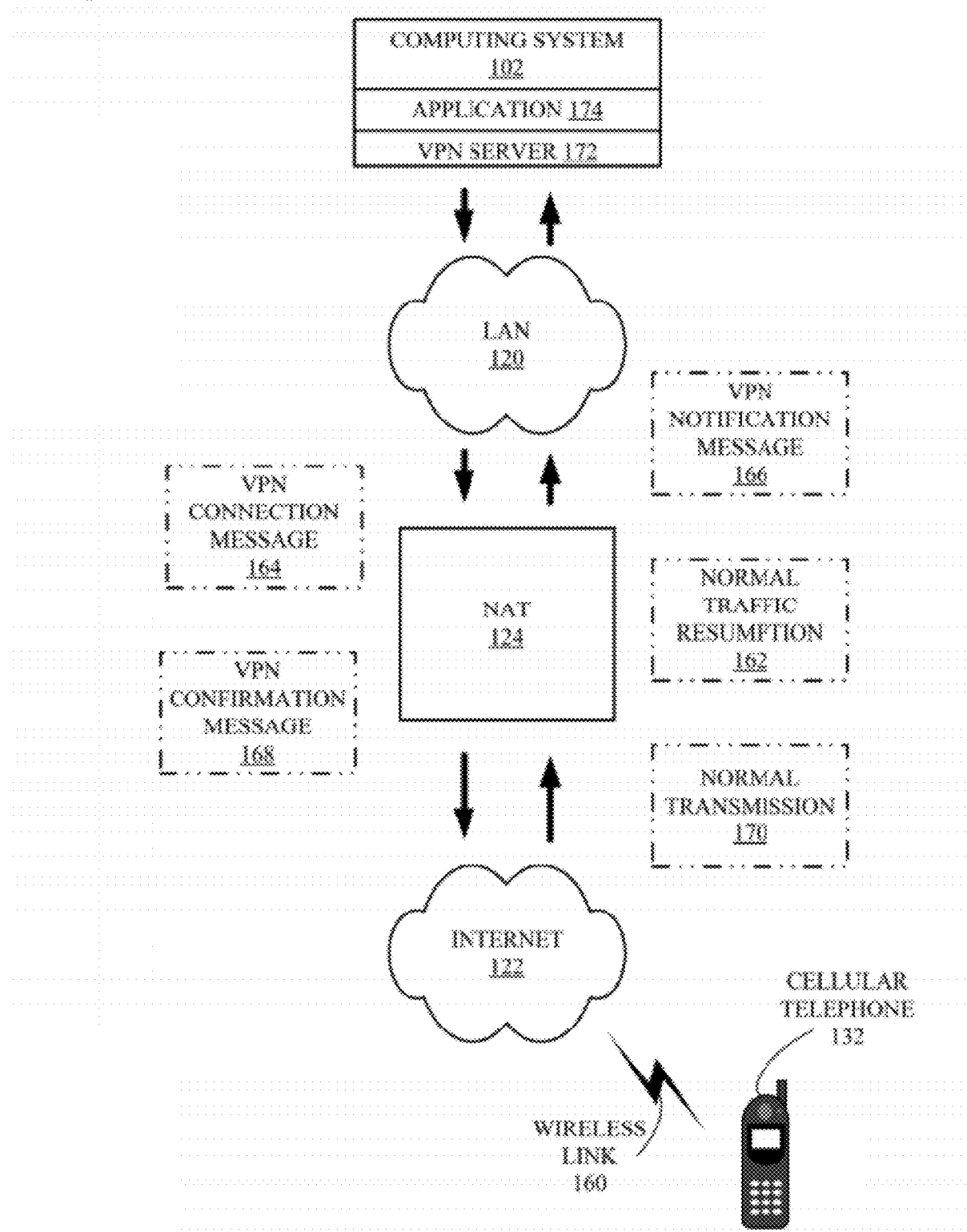
FIG. 3 is a block diagram illustrating exemplary data traffic between the cellular telephone and computing system via the NAT, each introduced in FIG. 1.

FIG. 3 is a block diagram illustrating exemplary data traffic between cellular telephone 132 and computing system 102 via NAT 124, each of which were introduced above in conjunction with FIG. 1. Also illustrated are LAN 120 (FIG. 1) and Internet 122 (FIG. 1).

Telephone 132 is communicating to computing system 102 via LAN 120, Internet 122, NAT 124 and a wireless connection 160, which may be one of wireless connections 126 or 136 (FIG. 1) or may be another wireless connection. In this figure, computing system 102 includes a virtual private network (VPN) server 172 and an application 174. Communications between telephone 132 and application 174 on computing system 102 via LAN 120, Internet 122, NAT 124 and wireless connection 160 are carried on a VPN tunnel established and maintained by VPN server 172. In this example, both application 174 and VPN server 172 are stored in data storage 112 (FIG. 1) and executed on CPU 104 (FIG. 1). VPN server 172 provides secure communication channels for applications or devices that are remote from computing system 102 and/or LAN 120. The setup and establishment of a secure VPN connection should be understood to those with skill in the computing and communication arts.

This figure illustrates the communication among VPN server 172, LAN 122, NAT 124 and telephone 132 after a period of time greater than the power timeout parameter described above in conjunction with FIG. 2. In other words, FIG. 3 illustrates the resumption of communication after a period of inactivity between application 174 and telephone 132. The communication is via the VPN tunnel established and maintained by VPN server 172. The period of inactivity is greater than or equal to a period of time specified in PCL configuration data 154 (FIG. 2), such that PCL timeout logic 152 (FIG. 2) has configured telephone 132 into a power conservation mode according to the claimed subject matter. The monitoring of telephone 132 with respect to the power timeout is described in detail below in conjunction with FIG. 5.

Some messages described below are generated by re-registration logic 158 (FIG. 2) of telephone 132. The first message transmitted is a Normal Traffic Resumption message 162, which notifies NAT 124 that telephone 132 is resuming transmission. In other words, the described techniques are initiated when normal traffic between telephone 132 and application 174 resumes after telephone 132 has entered a power conservation mode. Message 162 is simply the first packet transmitted by telephone 132 following a timeout rather than any special type of message. As explained above, a NAT 124 entry corresponding to telephone 132 is discarded after a period of time without activity that is shorter then a NAT entry timeout value. The power timeout value stored in PCL configuration data 154 is longer than the NAT entry timeout. It should be noted that even though the NAT 124 entry corresponding to telephone 132 has been deleted the VPN connection maintained by VPN server 172 is still active because, typically, VPN connections have much longer timeout parameters than NAT entries.

Once NAT 124 detects message 162, NAT 124 creates a table entry that correlates the IP address associated with telephone 132 with an internal IP address for telephone 132. Message 162 is then forwarded to VPN server 172, which detects that the internal IP address associated with message 162 does not correspond to a recognized VPN connection.

At this point VPN server 172 initiates an exchange with telephone 132 to correlate a particular VPN connection with the current traffic. A VPN connection message 164 is transmitted from VPN server 172 to telephone 132; a VPN notification message 166 is transmitted from telephone 132 to VPN server 172 with information relating to the existing VPN connection; and a VPN confirmation message 168 is transmitted from VPN server 172 to telephone 132 to notify telephone 132 that the VPN connection is reestablished. Messages 164, 166 and 168 enable VPN server 172 and telephone 132 to update information that correlates a particular connection to a particular VPN connection, in this case the connection between telephone 132 and application 174.

Following messages 162, 164, 166 and 168, telephone 132 resumes normal transmission 170. In addition to resuming normal transmission 170, telephone 132 resumes roaming, i.e. searching for a more optimum communication channel and switching communication to such a channel is detected.

Figure 4:
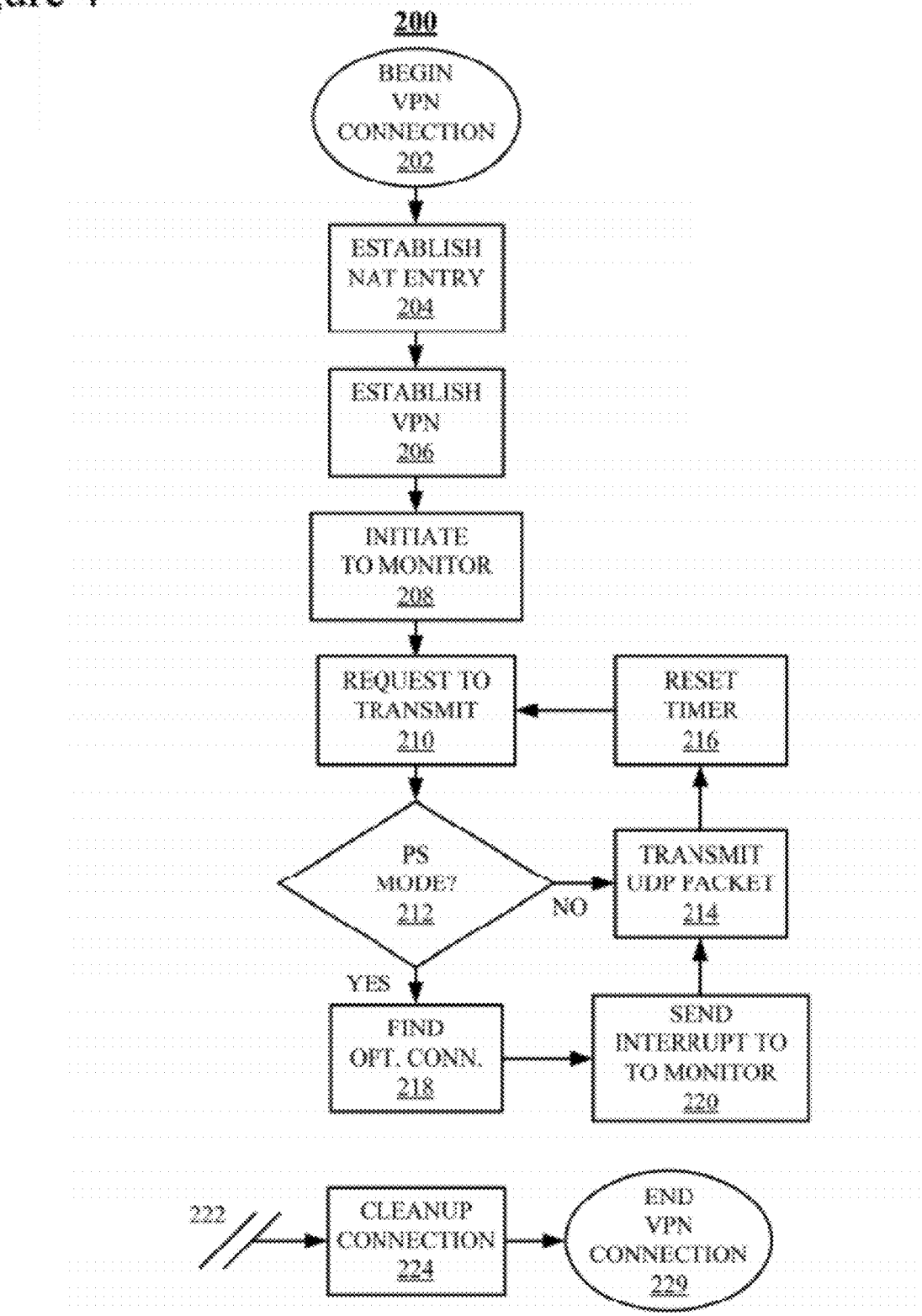
FIG. 4 is a flowchart of an Establish Virtual Private Network (VPN) process for establishing and utilizing VPN on a device that employs the claimed subject matter.

FIG. 4 is a flowchart of an Establish VPN connection process 200 for establishing and utilizing a virtual private network (VPN) on a device that employs the claimed subject matter. In the following example the device is telephone 132 (FIGS. 1 and 3), although the technique is applicable to any mobile device that communicates and in which power conservation is desirable, and telephone 132 is establishing, via VPN server 172 (FIG. 3), a VPN connection to application 174 (FIG. 3). Process 200 starts in a "Begin VPN Connection" block 202 and proceeds immediately to an "Establish NAT Entry" block 204. During block 204, process 200 communicates with NAT 124 (FIGS. 1 and 3) to correlate an external IP address corresponding to telephone 132 with an internal IP address corresponding to computing system 102 (FIGS. 1 and 3) on LAN 120 (FIGS. 1 and 3). As explained above in the Background, NAT 124 enables a group of devices or machines with local area network (LAN) access to share a single or small group of external IP addresses.

Once a NAT entry has been established during block 204, process 200 proceeds to an "Establish VPN" block 206 during which process 200 communicates with VPN server 172 to establish a VPN connection, or tunnel, between telephone 132 and application 174. During an "Initiate TO Monitor" block 208, a Time Out (TO) Monitor process 250 (see FIG. 5) is initiated on telephone 132. TO Monitor process 250 is explained in more detail below in conjunction with FIG. 5.

During a "Request to Transmit" block 210, process 200 waits for a request to transmit from telephone 132 through the VPN tunnel. A request may be generated by, for example but not limited to, a user manually initiating a telephone call carried by voice over IP (VoIP) or an automated process that updates a program such as an email folder. Once a request to transmit has been received during block 210, process 200 executes a "Power Save (PS) Mode?" block 212 during which process 200 determines whether or not telephone 132 is currently in a power conservation state. This determination is made by checking the value of the power state parameter stored in conjunction with configuration data module 154 (FIG. 2).

If process 200 determines that telephone is not currently in a power conservation state, control proceeds to a "Transmit UDP Packet" block 214. During block 214, process 200 transmits the packet received during block 210 to application 174 via the VPN tunnel established during 206. During a Reset Timer block 216, once the packet is transmitted, power TO timer 156 (FIG. 2) of PCL 150 (FIG. 2), both associated with Timeout (TO) Monitor process 250, is reset to a value equal to the power timeout parameter. Timer 156 and process 250 are explained in detail below in conjunction with FIG. 5. Once the power timer has been reset, control returns to Request to Transmit block 210 and processing continues as described above.

If, during block 212, process 200 determines that telephone 132 is in a power conservation mode, control proceeds to a "Find Optimum Connection (Opt. Conn.)" block 218. During block 218, telephone 132 scans available communication channels for the best available channel. As explained above in conjunction with the Background, telephone 132 may be configured to determine the best channel based upon several criteria such as, but not limited to, strongest signal or most cost effective channel. As explained below in conjunction with FIG. 5, according to the claimed subject matter, roaming is resumed in block 218 because it is suspended during a power conservation state.

During a "Send Interrupt to TO Monitor" block 220, process 200 transmits an asynchronous interrupt 260 (see FIG. 5) that causes a Timeout (TO) Monitor process 250 to transition to an active state or, in other words, exit a power conservation state. Process 200 then proceeds to block 214 during which, as explained above, the packet received during block 210 is transmitted. As explained above in conjunction with FIG. 3, a transmission of a packet following a power conservation state initiates the re-registration of telephone 132 with NAT 124. In other words, messages 162, 164, 166 and 168, described above in conjunction with FIG. 3, are transmitted and received by the appropriate devices to reestablish NAT 124 entry corresponding to telephone 132. Following the transmission of the packet during block 214, process 200 proceeds to Reset Timer block 216 and processing continues as described above.

In typical operation, process 200 executes continuously while telephone 132 is turned on. In the event telephone is turned off, an asynchronous interrupt 222 is generated. Regardless of the current execution state, interrupt 222 causes process 200 to proceed to a "Cleanup Connection" block 224 during which the VPN connection established during block 206 is terminated. In another embodiment, the VPN connection is not explicitly cleaned up but rather VPN server 172 eventually takes care of all connections that have been inactive for a specified period of time. Once the VPN connection is terminated and any other necessary cleanup activities are executed, process 200 proceeds to an "End VPN Connection" block 229 during which process 200 is complete.

FIG. 5 is a flowchart of a Monitor Power process 250 executed on telephone 132 according to the claimed subject matter. Briefly, process 250 determines when a period of inactivity on telephone 132 has exceeded the power timeout parameter stored in conjunction with PCL configuration data 154 of PCL 150, described above in conjunction with FIG. 2.

Process 250 starts in a "Begin Timeout (TO) Monitor" block 252 and proceeds immediately to a "Set Power TO Timer" block 254. During block 254, a power TO timer 156 (FIG. 2) is set to the value of the power timeout parameter stored in conjunction with PCL configuration data module 154. As explained above in conjunction with FIG. 4, timer 156 is reset during Reset Timer block 216 of process 200 whenever telephone 132 transmits via the VPN tunnel.

If a period of time equal to the power timeout parameter has passed without VPN activity on telephone 132, timer 156 expires, generating an asynchronous interrupt 256. Interrupt 256 causes control of process 250 to proceed to an "Enter Power Save Mode" block 258.

During block 258, telephone suspends keep-alive messages and discontinues roaming. In this manner, telephone 132 conserves battery power during periods of inactivity. When asynchronous interrupt 260, first introduced above in conjunction with FIG. 4, is generated, process 250 transitions from block 258 to block 254 and processing continues as described above. As explained above, asynchronous interrupt 260 is generated by process 200 (FIG. 4) when telephone 132 is in the power conservation state and has a packet to transmit and the transition is associated with a return to an active state in which keep-alive messages and roaming are resumed in telephone 132.

Process 250 is designed to operate continuously while telephone 132 is powered on. If however telephone 132 is powered off or a user wishes to disable the claimed power conservation features, an asynchronous interrupt 262 causes process 250 to proceed immediately to an "End TO Monitor" block 269 in which process 250 is complete.

In another embodiment, rather than an event driven timer, the detection of a period of inactivity that exceeds the power timeout parameter may be accomplished by periodically comparing the current time to the time of the most recent activity of telephone 132 that employed the VPN tunnel. Those with skill in the computing arts should appreciate that there are many ways of detecting whether or not a particular period of inactivity exceeds the power timeout value.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

I claim:

1. A method for conserving power on a mobile computing device, comprising:
    defining a power timeout parameter corresponding to a period of inactivity for a mobile computing device, wherein a time interval defined by the power timeout parameter is based on and longer than a time interval defined by a network address translation (NAT) timeout parameter associated with a communication channel on a first network connection;
    setting a timer equal to time interval defined by the power timeout parameter;
    detecting activity on the mobile computing device associated with the communication channel;
    resetting the timer to time interval defined by the power timeout variable when activity associated with the communication channel is detected;
    transitioning the mobile computing device into a power conservation state when the timer expires;
    detecting activity associated with the communication channel while the mobile computing device is in the power conservation state;
    scanning for a second network connection that is faster than the first network connection;
    transitioning, when the mobile computing device is in the power conservation state, the mobile computing device from the power conservation state to an active state when activity associated with the communication channel is detected by establishing the communication channel on the second network connection.

2. The method of claim 1, the transitioning the mobile computing device into the power conservation state comprising discontinuing transmission of keep-alive messages on the communication channel.

3. The method of claim 2, the transitioning the mobile computing device into the power conservation state further comprising discontinuing roaming activities associated with the mobile computing device.

4. The method of claim 1, the transitioning the mobile computing device from the power conservation state to the active state comprising:
    resetting the timer equal to the power timeout parameter;
    resuming transmission of keep-alive messages; and
    resuming roaming activities.

5. The method of claim 1, wherein the communication channel is a virtual private network (VPN) tunnel.

6. A system for conserving power in a mobile computing device, comprising:
    a power timeout parameter corresponding to a period of inactivity for a mobile computing device, a time interval defined by the power timeout parameter is longer than a time interval defined by a network address translation (NAT) timeout parameter associated with a communication channel on a first network connection;
    a timer;
    logic for detecting activity on the mobile computing device associated with the communication channel;
    logic for transitioning the mobile computing device into a power conservation state when the timer indicates that a period of inactivity on the mobile computing device associated with the communication channel has exceeded the power timeout parameter;
    logic for scanning for a second network connection that is faster than the first network connection; and
    logic for transitioning, when the mobile computing device is in the power conservation state, the mobile computing device from the power conservation state to an active state when activity associated with the communication channel is detected by establishing the communication channel on the second network connection.

7. The system of claim 6, the logic for transitioning the mobile computing device into a power conservation state comprising logic for discontinuing transmission of keep-alive messages on the communication channel.

8. The system of claim 7, the logic for transitioning the mobile computing device into a power conservation state further comprising logic for discontinuing roaming activities associated with the mobile computing device.

9. The system of claim 6, the logic for transitioning the mobile computing device from the power conservation state to the active state comprising:
    logic for resuming transmission of keep-alive messages; and
    logic for resuming roaming activities.

10. The system of claim 6, wherein the communication channel is a virtual private network (VPN) tunnel.

11. A non-transitory, computer-readable medium embodying computer instructions for conserving power in a mobile computing device, comprising:
    a non-transitory memory;
    a power timeout parameter, stored on the non-transitory memory, corresponding to a period of inactivity for a mobile computing device, wherein a time interval defined by the power timeout parameter is longer than a time interval defined by a network address translation (NAT) timeout parameter associated with a communication channel on a first network connection; and computer instructions, stored on the non-transitory memory for execution on a processor, for:
- setting a timer equal to time interval defined by the power timeout parameter;
- detecting activity on the mobile computing device associated with the communication channel;
- resetting the timer to time interval defined by the power timeout variable when activity associated with a communication channel is detected;
- transitioning the mobile computing device into a power conservation state when the timer expires;
- detecting activity associated with the communication channel while the mobile computing device is in the power conservation state;
- scanning for a second network connection that is faster than the first network connection; and
- transitioning, when the mobile computing device is in the power conservation state, the mobile computing device from the power conservation state to an active state when activity associated with a communication channel is detected by establishing the communication channel on the second network connection.

12. The non-transitory computer-readable medium embodying computer instructions of claim 11, the computer instructions for transitioning the mobile computing device into the power conservation state comprising computer instructions for discontinuing transmission of keep-alive messages on the communication channel.

13. The non-transitory computer-readable medium embodying computer instructions of claim 12, the computer instructions for transitioning the mobile computing device into the power conservation state further comprising computer instructions for discontinuing roaming activities associated with the mobile computing device.

14. The non-transitory computer-readable medium embodying computer instructions of claim 11, the computer instructions for transitioning the mobile computing device from the power conservation state to the active state comprising instructions for:
- resetting the timer equal to the power timeout parameter;
- resuming transmission of keep-alive messages; and
- resuming roaming activities.

15. The non-transitory computer-readable medium embodying computer instructions of claim 11, wherein the communication channel is a virtual private network (VPN) tunnel.

16. A cellular telephone, comprising:
- a power timeout parameter corresponding to a period of inactivity for the cellular, wherein a time interval defined by the power timeout parameter is longer than a time interval defined by a network address translation (NAT) timeout parameter associated with a communication channel on a first network connection;
- a timer;
- logic for detecting activity on the cellular telephone associated with the communication channel;
- logic for transitioning the mobile cellular telephone into a power conservation state when the timer indicates that a period of inactivity on the cellular telephone associated with the communication channel has exceeded the power timeout parameter;
- logic for scanning for a second network connection that is faster than the first network connection; and
- logic for transitioning, when the cellular telephone is in the power conservation state, the cellular telephone from the power conservation state to an active state when activity associated with a communication channel is detected by establishing the communication channel on the second network connection.

17. The cellular telephone of claim 16, the logic for transitioning the cellular telephone into a power conservation state comprising logic for discontinuing transmission of keep-alive messages on the communication channel.

18. The cellular telephone of claim 17, the logic for transitioning the cellular telephone into a power conservation state further comprising logic for discontinuing roaming activities associated with the cellular telephone.

19. The cellular telephone of claim 16, the logic for transitioning the cellular telephone from the power conservation state to the active state comprising logic for resuming transmission of keep-alive messages.

20. The cellular telephone of claim 19, the logic for transitioning the cellular telephone from the power conservation state to the active state further comprising logic for resuming roaming activities.

21. A method for conserving power on a mobile computing device, comprising:
- defining a power timeout parameter corresponding to a period of inactivity for a mobile computing device, wherein a time interval defined by the power timeout parameter is longer than a time interval defined by a network address translation (NAT) timeout parameter associated with a communication channel on a first network connection;
- setting a timer equal to time interval defined by the power timeout parameter;
- detecting activity on the mobile computing device associated with the communication channel;
- resetting the timer to time interval defined by the power timeout variable when activity associated with a communication channel is detected;
- transitioning the mobile computing device into a power conservation state when the timer expires;
- detecting activity associated with the communication channel while the mobile computing device is in the power conservation state;
- scanning for a second network connection that is faster than the first network connection; and
- transitioning the mobile computing device from the power conservation state to an active state when activity associated with a communication channel is detected while the mobile computing device is in the power conservation state by establishing the communication channel on the second network connection.

22. The method of claim 21, the transitioning the mobile computing device into the power conservation state comprising discontinuing transmission of keep-alive messages on the communication channel.

23. The method of claim 22, the transitioning the mobile computing device into the power conservation state further comprising discontinuing roaming activities associated with the mobile computing device.

24. The method of claim 21, the transitioning the mobile computing device from the power conservation state to the active state comprising:
- resetting the timer equal to the power timeout parameter;
- resuming transmission of keep-alive messages; and
- resuming roaming activities.

25. The method of claim 21, wherein the communication channel is a virtual private network (VPN) tunnel.

* * * * *